United States Patent [19]

Tokarz

[11] Patent Number: 5,692,536
[45] Date of Patent: Dec. 2, 1997

[54] INVERTIBLE QUARTER TURN STOP

[75] Inventor: Steven J. Tokarz, Indianapolis, Ind.

[73] Assignee: Masco Corporation of Indiana, Indianapolis, Ind.

[21] Appl. No.: 555,958

[22] Filed: Nov. 13, 1995

[51] Int. Cl.⁶ .............................. F16K 5/10; F16K 51/00
[52] U.S. Cl. ................................................ 137/270; 251/288
[58] Field of Search ............................. 137/270; 251/285, 251/286, 288

[56] References Cited

U.S. PATENT DOCUMENTS

| 2,468,261 | 4/1949 | Wildern | 251/286 |
| 3,831,621 | 8/1974 | Anthony et al. | 137/270 |
| 4,005,728 | 2/1977 | Thorp | 137/270 |
| 4,397,330 | 8/1983 | Hayman | 137/270 |
| 4,651,770 | 3/1987 | Denham et al. | 137/270 |
| 4,793,375 | 12/1988 | Marty | 137/270 |
| 4,821,765 | 4/1989 | Iqbal et al. | 137/270 |
| 4,901,750 | 2/1990 | Niclas et al. | 137/270 |
| 4,981,156 | 1/1991 | Niclas et al. | 137/270 |
| 5,398,717 | 3/1995 | Goncze | 137/270 |

Primary Examiner—John Rivell
Attorney, Agent, or Firm—Myron B. Kapustij; Malcolm L. Sutherland

[57] ABSTRACT

A stop member and an invertible quarter turn insert for the stop member for allowing ready interchangeability of knob handles and lever handles on quarter turn two handle faucet valves. The stop member includes a stop detent and an arcuate groove bounded by the side edges of the stop detent. The invertible quarter turn insert comprises a generally annular member having a ring portion and a stop tab having a section extending above the plane of the ring portion and a section extending below the plane of the ring portion. One section of the stop tab is inserted into the groove on one side of the stop tab with the other section of the stop tab cooperating with the stop detent to extend the arc of the stop detent in one circumferential direction. Inverting the stop insert results in one section of the stop tab being inserted into the groove on the opposite side of the stop detent with the other section of the stop cooperating with the stop detent to extend the arc of the stop detent in the opposite circumferential direction. By selecting the appropriate position of the quarter turn stop insert knob handles can be readily interchanged with lever handles.

10 Claims, 4 Drawing Sheets

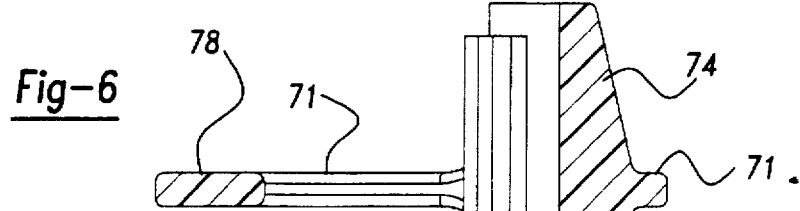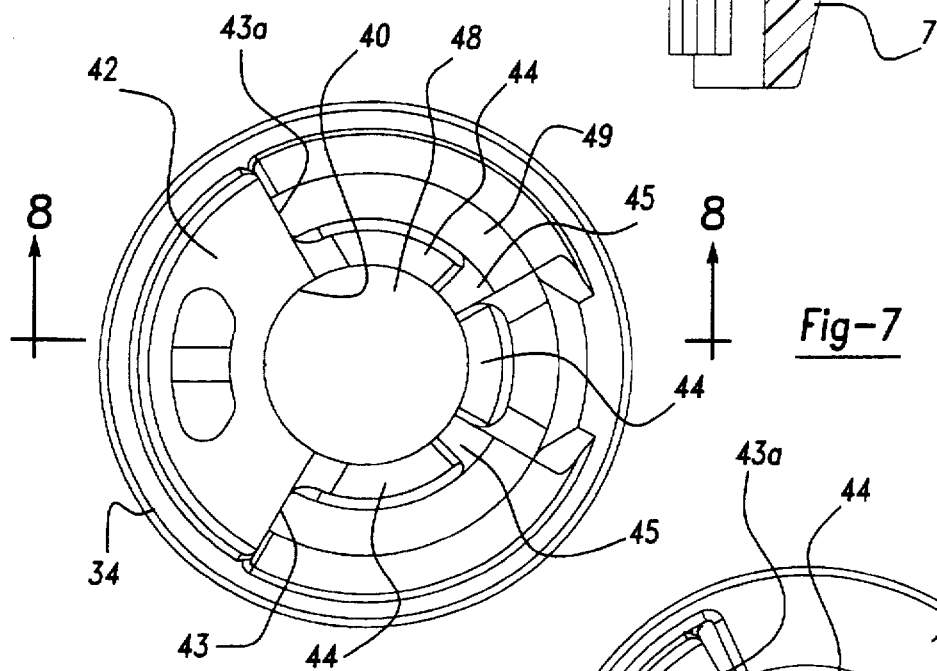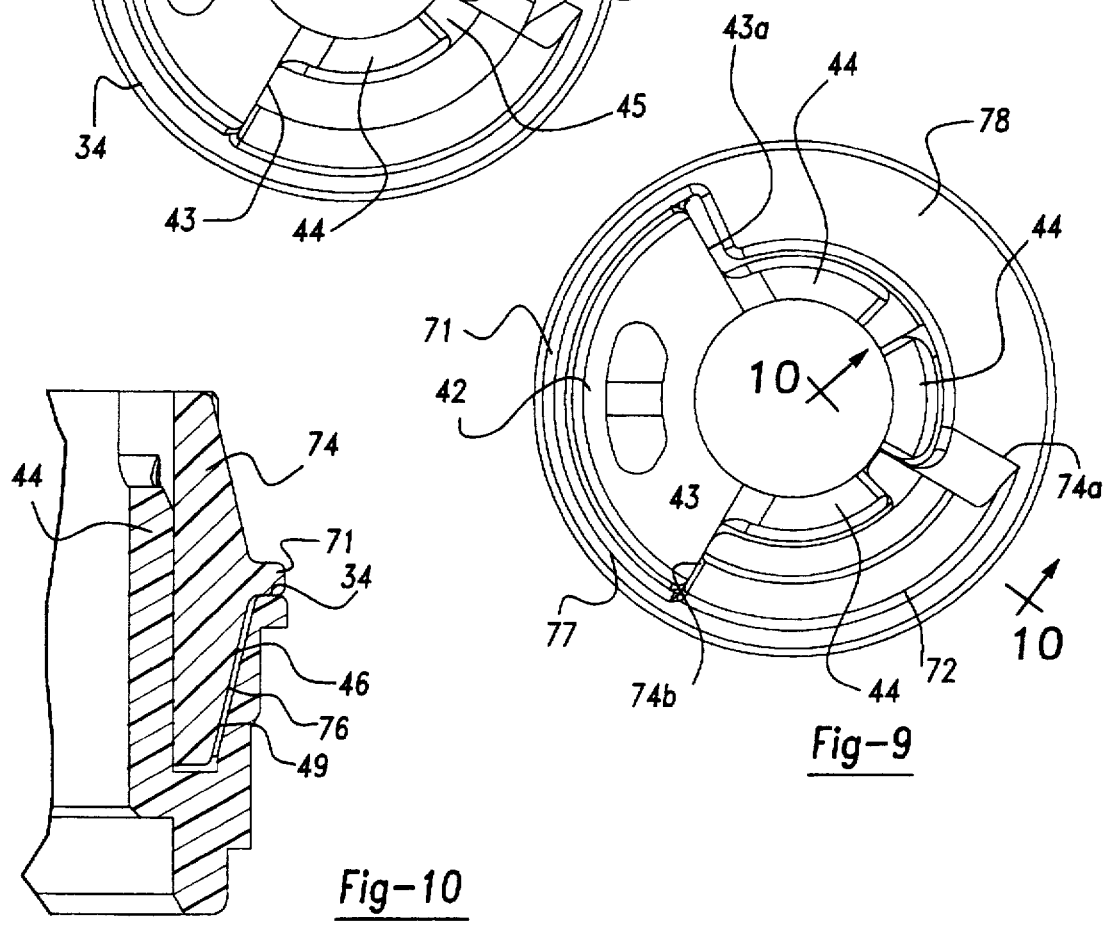

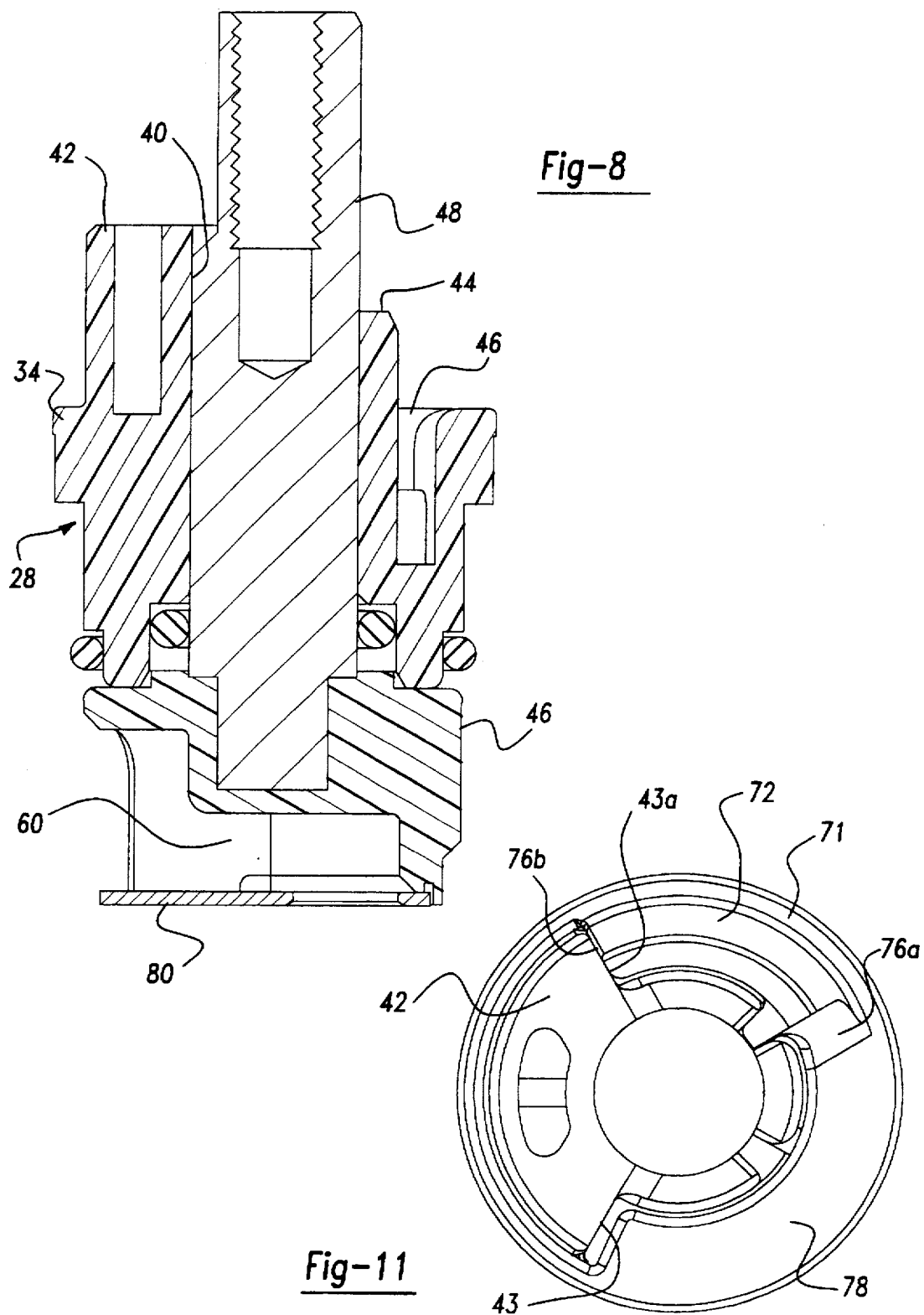

5,692,536

1

INVERTIBLE QUARTER TURN STOP

FIELD OF THE INVENTION

The instant invention is directed to a means for allowing the ready interchangeability of knob handles and lever handles in quarter turn two handle faucet valves.

BACKGROUND OF THE INVENTION

Two handle mixing valves utilizing a rotatable valve assembly having a steel plate which forms the interior flow passage of the valving member are well known. In one type of valve the handles rotate 180° (half turn valves), while in another type the handles rotate 90° (quarter turn valves). In both types of two handle mixing valves the left valve, as one is facing the faucet, provides hot water while the right valve provides cold water. These valves can be provided with either knob type or lever type handles. However, the operation of the knob handles and lever handles are quite different. To turn the hot water valve on the lever handle is turned in a counterclockwise direction. To turn the cold water valve on the lever handle is turned in a clockwise direction. In knob handles rotation of the knobs in a counterclockwise direction turns both the hot and cold water valves on.

Due to this different mode of operation it is not possible with currently available quarter turn valves to replace knob handles with lever handles or lever handles with knob handles if one wishes to change the handle style from knob to lever or vice versa. Instead, the entire stop member of the valves or of the handles must be replaced in order to convert the handles from knobs to levers or levers to knobs. This is a time consuming and somewhat expensive procedure requiring several different types of stop members.

It would be quite advantageous if a means were provided in quarter turn two handle mixing valves wherein knob handles could be replaced with lever handles or lever handles replaced with knob handles without the necessity of having to dedicate left and right stop members or replace the stop members. The instant invention provides such a means. More particularly, the instant invention provides a stop member and an invertible quarter turn stop insert cooperating with the stop member whereby by merely inverting the stop insert in the stop member allows for interchangeability of knob and lever handles in quarter turn two handle mixing valves.

SUMMARY OF THE INVENTION

The present invention overcomes the disadvantages of the prior art quarter turn two handle faucets by providing a stop member and a quarter turn stop insert cooperating with the stop member which allow the interchangeable use of knob type handles and lever type handles.

The stop member, which limits the rotational movement of the valving member, is fixedly secured within the valve body such that the valve stem extends therethrough. The stop member includes a stop detent which cooperates with the faucet handle to control the rotational movement of the valve member. The stop insert is a generally annular member having a ring section and a stop tab which has a first section extending above the plane of the ring and a second section extending below the plane of the ring. The stop tab of the stop insert cooperates with the stop detent of the stop member to extend the effective arc of the stop detent. The stop tab functions as an extension of the stop detent of the stop member. In one position the stop tab extends the effective arc of the stop member in one circumferential direction. In a second, inverted position the stop tab cooperates with the stop detent to extend the effective arc of the stop detent in the opposite circumferential direction. This allows the interchangeability of knob and lever handles.

BRIEF DESCRIPTION OF THE DRAWINGS

FIG. 6 is an elevational, sectional view taken along lines 6—6 in FIG.5;

FIG. 7 is a top plan view of the stop member and valve assembly without the quarter turn stop member;

FIG. 8 is an elevational sectional view taken along line 8—8 in FIG. 7;

FIG. 9 is a top plan view of the stop member with the quarter turn stop member mounted therein in position B of FIG. 2;

FIG. 10 is an elevational sectional view taken along line 10—10 in FIG. 9; and

FIG. 11 is a top plan view of the stop member with the quarter turn stop member mounted therein in position A of FIG. 2.

DETAILED DESCRIPTION OF THE PREFERRED EMBODIMENTS

Figure 1:
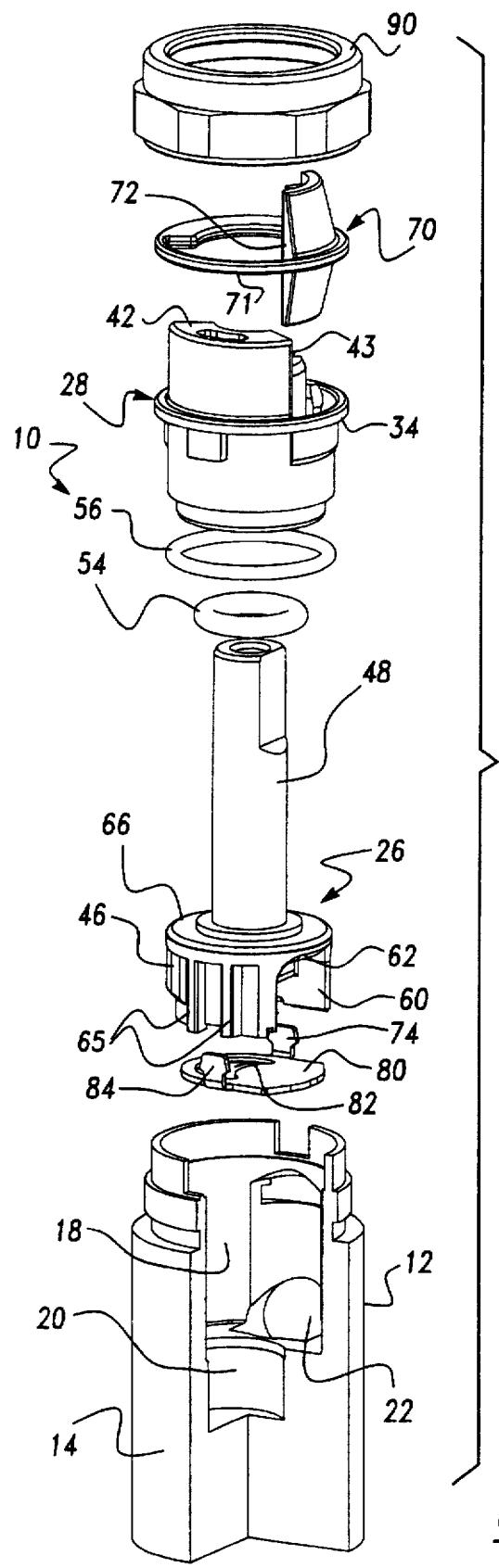
FIG. 1 is an exploded perspective view of the valve assembly, including the invertible quarter turn stop, of the instant invention.
Figure 2:
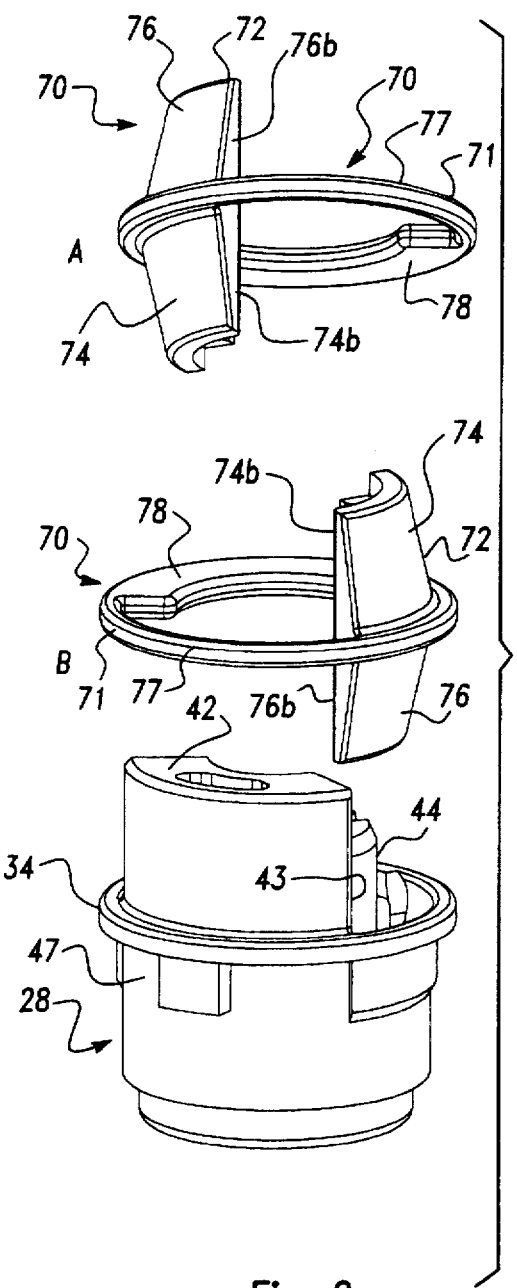
FIG. 2 is an exploded perspective view of the quarter turn stop and the stop member, with the quarter turn stop being shown in both positions.
Figure 3:
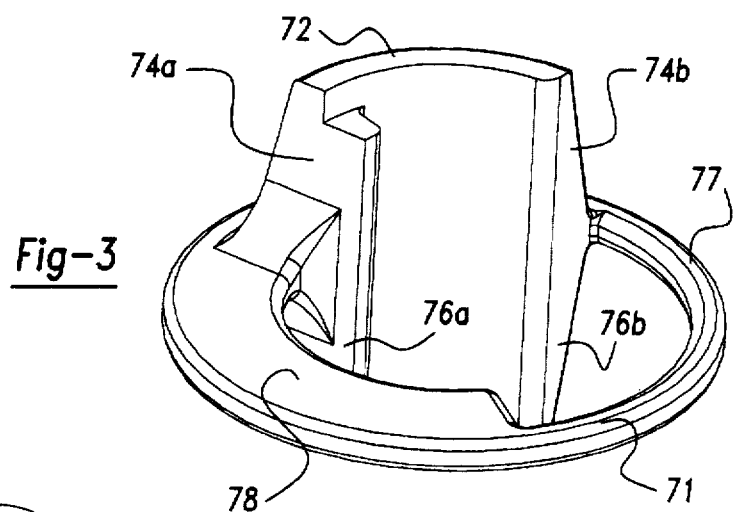
FIG. 3 is an enlarged perspective view of the quarter turn stop member, the position of the quarter turn stop member being the same as the lower position B of the quarter turn stop member illustrated in FIG. 2.

Referring to FIG. 1 of the drawings, there is shown a faucet valve 10 embodying the present invention. The valve 10 includes a conventional and well known generally cylindrical valve body 12 adapted to be connected in a conventional manner to a supply of hot or cold water. The water flows upwardly through a central bore in the portion 14 of the valve body. The valve body 12 also includes a first bore 18 and a second bore 20 smaller than the first bore 18. The second bore 20 is offset from the longitudinal axis of the first bore 18 and connects the central bore to the bore 18 to form an inlet passage for the valve body 12. An outlet port 22 is formed in the side wall of the valve body 12 and is open to the first bore 18. During operation water flows upwardly through the passages and out the port 22.

Disposed within the larger first bore 18 is a valve assembly 26. The valve assembly 26 is secured within the valve body 12 by a collar 90 which is secured, such as threadedly secured, to the upper end of the valve body 12. The top flange of the collar engages the upper surface of ring portion 71 of quarter turn stop insert 70 which is disposed on the upper surface of a shoulder 34 formed on the stop member 28 so that when the collar 90 is tightened the valve assembly 26, stop member 28, and quarter turn stop insert 70 will be properly positioned within the valve body 12.

The stop member 28 includes a central throughbore 40 adapted to receive a portion of the valve assembly 26, specifically the stem 48. Integrally formed on the top of the stop member 28 is a stop detent 42 having outer side edges 43 and 43a one of which acts as a stop means to limit the rotational movement of the valve assembly 26 and the other of which is in abutment with or adjacent to side edge 74b or 76b of quarter turn stop insert 70. Preferably, the stop member 28 is an integrally formed plastic member having a plurality of fingers 44 extending axially upwardly around the central throughbore 40. Fingers 44 are separated by spaces 45. A groove 49 is formed between fingers 44 and the outer wall 47 of the stop member 28. The groove 49 terminates at the outer edges 43, 43a of stop detent 42.

Figure 4:
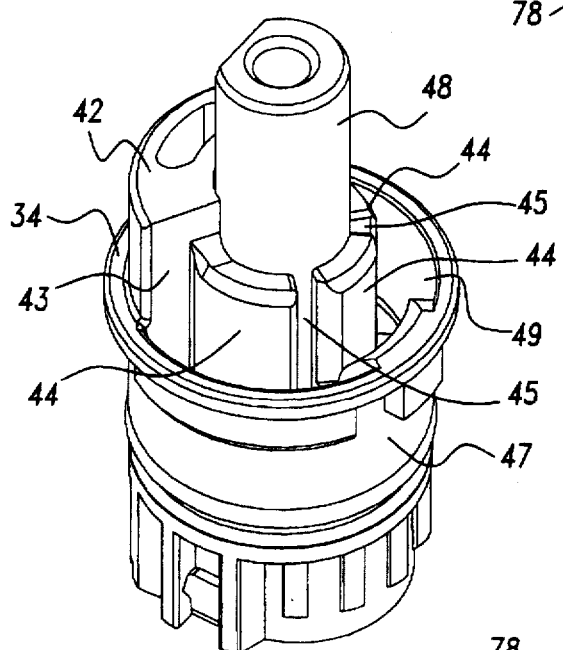
FIG. 4 is a top perspective view of the stop member and the valve assembly in an assembled position but without the quarter turn stop member.
Figure 5:
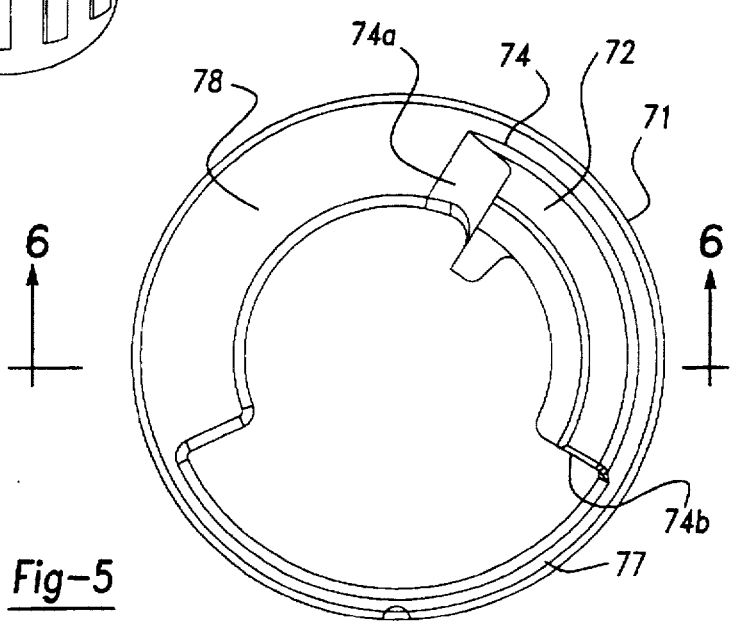
FIG. 5 is a top plan view of the quarter turn stop member.

The valve assembly 26 includes fluid flow housing 46 and an operating stem 48 integrally formed therewith. The stem 48 extends through the bore 40 of the stop member 28 and, as best illustrated in FIG. 4, is surrounded by fingers 44 and detent member 42. An operating member or faucet handle is connected to the upper end of the stem 48 as, for example, by a set screw. The handle is used to rotate the valve assembly 26 relative to the valve body 12 and stop member 28 in order to control the fluid flow through the valve 10. An inner O-ring seal 54 fits over the valve stem 48 and provides a fluid seal between the valve stem and the stop member 28. An outer O-ring seal 56 is seated within the groove formed between the stop member 28 and the valve assembly 26 in order to provide a fluid seal between the valve body 12 and the valve assembly 26.

As best shown in FIG. 1, the fluid flow housing 46, which is integrally formed with the valve stem 48 utilizing well known plastic molding techniques, at least partially defines an interior flow chamber 60 formed by a partial axial bore which is open to the bottom of the valve assembly 26. The housing 46 also includes a removed wall portion which defines the outlet passageway 62 of the flow chamber 60. The housing 46 also includes a removed wall portion which defines the outlet passageway 62 of the flow chamber 60. The housing 46 includes a series of axially extending reinforcement ribs 65 which extend from the bottom of the housing 46 to an annular shoulder 66 upon which the stop member 28 and O-ring 56 are seated. Ribs 65 ensure that the valve assembly 26 is properly positioned while providing uniform rotation within the valve body 12.

Secured to the bottom of the valve assembly 26 is a flow plate 80 having an aperture 82 formed therein. In the preferred embodiment of the flow plate 80, the aperture 82 has a substantially crescent shape and is offset from the center of rotation of the flow plate 80 and the valve assembly 26. Extending perpendicular to the flow plate 80 are at least two attachment tabs 84 adapted to detachably secure the plate 80 to the bottom of the valve assembly 26 thereby cooperating with the fluid flow housing 46 to form the flow chamber 60 and the outlet passage 62. Tabs 84 engage pairs of spaced ribs disposed on opposite sides of the valve assembly 26. Although the tabs 84 may be any configuration which ensures secure attachment, the tabs 84 of the present invention have a trapezoidal configuration whereby the longer base section engages the ribs 65 to retard disengagement of the tabs 84 from the ribs 65 while the tapered upper section facilitates insertion of the tabs 74 between each pair of ribs 65.

The flow plate 80 is constructed of stainless steel designed to withstand wear and damage caused by the fluid flow and any particulates which may be found in the fluid. Preferably, the flow plate 80 is stamped from a stainless steel blank with the tabs 84 formed coplanar with the valving surface. Prior to attachment, the tabs 84 are bent upwardly perpendicular to the valving surface.

The operation of the valve assembly is described in U.S. Pat. No. 4,700,928 which is incorporated herein by reference.

The reversible quarter turn stop insert 70 is generally annular in shape having a stop tab 72. Tab 72 has a top portion 74 extending above the plane of the ring portion 71 of insert 70 and a bottom portion 76 extending below the plane of ring portion 71. Top portion 74 has two side edges 74a and 74b, with side edge 74b adapted to abut against or be adjacent to side edge 43 or 43a of detent member 42. Bottom portion 76 also has two side edges 76a and 76b, with side edge 76b adapted to abut against or be adjacent to side edge 43 or 43a of detent member 42. The ring portion 71 is comprised of a narrow section 77 and a wide, radially inwardly extending section 78.

The insert 70 is disposed in the stop member by inserting one portion 74 or 76 of stop tab 72 into the groove 49 in stop member 28. With one portion of stop tab 72 inserted into groove 49 the ring portion 71 of insert 70 rests on top of the shoulder 34 of stop member 28. The narrow section 77 of the ring 71 fits over stop detent 42. The two portions 74 and 76 of stop tab 72 are sized to fit within the groove 49 in stop member 28. The narrow section 77 of ring 71 has substantially the same arc and is substantially complementary in configuration to the radially outer or back face of the stop detent 42.

Due to the configuration of ring 71, i.e., the presence of the narrow section 77 and wide section 78, side edges 74b and 76b are always in abutment against or adjacent to one of side edges 43 or 43a of detent 42. The side edges 74a and 76a of stop tab 72 are never in abutment against or adjacent to side edges 43 or 43a but are contacted by the corresponding stop detent in the interior of the handle.

As illustrated in FIG. 9 side edge 74b is adjacent side edge 43 while side edges 74a and 43a are adapted to be contacted by the corresponding stop detent in the interior of the handle. In FIG. 11 the insert 70 is inverted relative to its position in FIG. 9. In FIG. 11 side edge 76b is adjacent side edge 43a and side edge 76a of stop tab 72 and 43 of stop detent 42 serve as stops cooperating with the stop detent in the interior of the handle in order to limit rotation of the handle. The stop tab 72 in effect extends the effective arc of the stop detent 42, the arc being extended in one circumferential direction when the stop insert 70 is in one position and in the opposite circumferential direction when the stop insert 70 is inverted. The stop tab 70 thus functions as an extension of the stop tab 42.

The quarter turn stop insert of the instant invention allows the interchangeable use of knob and lever handles on two handled faucets. With the quarter turn stop insert 70 being in the position illustrated in FIG. 11 knob handles can be used on both the left (hot) and right (cold) valve assemblies. In order to replace the knob handles with lever handles the quarter turn stop insert 70 is kept in the position shown in FIG. 11 for the left (hot) valve assembly, but is inverted to the position shown in FIG. 9 for the right (cold) valve assembly.

Another advantage of the instant stop member 28 and quarter turn stop insert 70 is that by deleting or not using the quarter turn stop insert the valve, using only the stop member 28, is converted from a quarter turn (90°) valve to a half turn (180°) valve. In such half turn valves knob handles and lever handles are readily interchangeable.

The foregoing detailed description has been given for clearness of understanding only and no unnecessary limitations should be understood therefrom as some modifications will be obvious to those skilled in the art without departing from the scope and spirit of the appended claims.

What is claimed is:

1. A stop assembly for providing interchangeability of knob handles and lever handles on quarter turn valves of a two valve faucet comprising a stop member which fits over the stem of a valve and a quarter turn stop insert cooperating with said stop member to provide said interchangeability of lever and knob handles, said stop member comprising

- a body portion having a central aperture adapted to receive a stem of a valve,
- a stop detent extending above said body portion and having a first side edge and a second side edge,
- a groove bounded by said first side edge and said second side edge of said stop detent;
- said quarter turn stop insert comprising a generally annular member having a ring section and a stop tab having a first section extending above the plane of said ring section and a second section extending below the plane of said ring section, said first and second tab sections being adapted to fit within said groove in said stop member with said first tab section or said second tab section being adjacent to said stop detent.

2. The stop assembly of claim 1 wherein said stop tab is formed integrally with said ring section.

3. The stop assembly of claim 1 wherein said ring section comprises a narrow portion and a wide portion.

4. The stop assembly of claim 1 wherein said wide portion extends radially inwardly.

5. The stop assembly of claim 1 wherein said quarter turn stop insert is comprised of plastic.

6. The stop assembly of claim 2 wherein said stop tab is arcuate in shape.

7. The stop assembly of claim 1 wherein said stop detent is arcuate in shape.

8. The stop assembly of claim 7 wherein said groove is arcuate in shape.

9. The stop assembly of claim 1 wherein said central aperture is bounded by said stop detent and at least one upwardly extending finger.

10. The stop assembly of claim 9 wherein said groove is bounded on the outside by the outer wall of said stop member and on the inside by said at least one finger.

* * * * *